United States Patent [19]

Morgan

[11] Patent Number: 4,563,320
[45] Date of Patent: Jan. 7, 1986

[54] MAKING THERMOPLASTIC ITEMS

[75] Inventor: Allan C. Morgan, Manchester, Mass.

[73] Assignee: Hummor, Inc., Manchester, Mass.

[21] Appl. No.: 674,599

[22] Filed: Nov. 26, 1984

Related U.S. Application Data

[63] Continuation-in-part of Ser. No. 459,461, Jan. 20, 1983, abandoned.

[51] Int. Cl.[4] .................. B29C 17/00; B29D 7/02
[52] U.S. Cl. .................................. 264/151; 264/160; 264/178 R; 264/237; 264/322; 264/297.1; 264/297.5; 264/297.6; 425/71; 425/325; 425/335; 425/363; 425/371; 156/244.24; 156/244.27
[58] Field of Search ............ 264/151, 160, 167, 210.1, 264/210.2, 210.3, 178 R, 297.7, 297.6; 425/71, 325, 335, 363, 371; 156/244.24, 244.27

[56] References Cited

U.S. PATENT DOCUMENTS

| | | | |
|---|---|---|---|
| 3,099,043 | 7/1963 | Held | 264/297.7 |
| 3,121,913 | 2/1964 | Hagmann et al. | 425/363 |
| 3,197,536 | 7/1965 | French | 425/363 X |
| 3,351,977 | 11/1967 | Gasch et al. | 425/335 X |
| 3,530,536 | 9/1970 | Thorman et al. | 425/71 X |
| 3,538,210 | 11/1970 | Gatto | 425/71 X |
| 3,804,567 | 4/1974 | Recknogel | 425/71 |
| 3,989,779 | 11/1976 | Brunnhofer | 425/71 X |
| 3,999,928 | 12/1976 | Asakura et al. | 425/363 X |
| 4,154,563 | 5/1979 | Johnson | 425/325 X |
| 4,157,235 | 6/1979 | Lagabe et al. | 425/325 X |
| 4,194,827 | 3/1980 | Hinterkeuser et al. | 425/335 X |
| 4,211,743 | 7/1980 | Nauta et al. | 425/363 X |
| 4,238,266 | 12/1980 | Steinberg et al. | 156/244.27 X |
| 4,304,622 | 12/1981 | Krumm | 156/244.27 X |
| 4,306,927 | 12/1981 | Funk et al. | 156/244.27 X |
| 4,395,210 | 7/1983 | Hama | 425/71 |
| 4,449,910 | 5/1984 | Leloux | 425/325 |

*Primary Examiner*—J. Howard Flint, Jr.
*Attorney, Agent, or Firm*—Charles Hieken

[57] ABSTRACT

An extruder delivers an extrudate at a temperature in the low end of the extruding range between 250° and 550° F. between opposed rollers carrying mating dies. The dies are sprayed with mold release agent when away from the extrudate. The extrudate is cooled after leaving the region between a pair of rollers and may enter the region between other similar pairs of rollers. Cold plastic inserts may be inserted into molded items.

10 Claims, 7 Drawing Figures

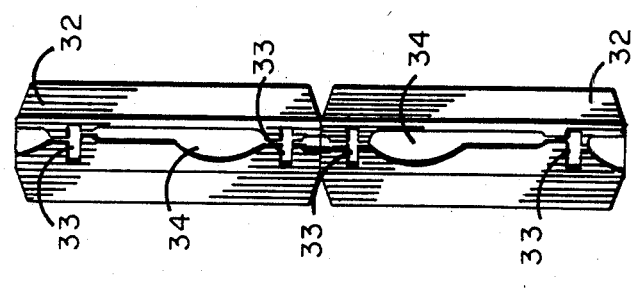
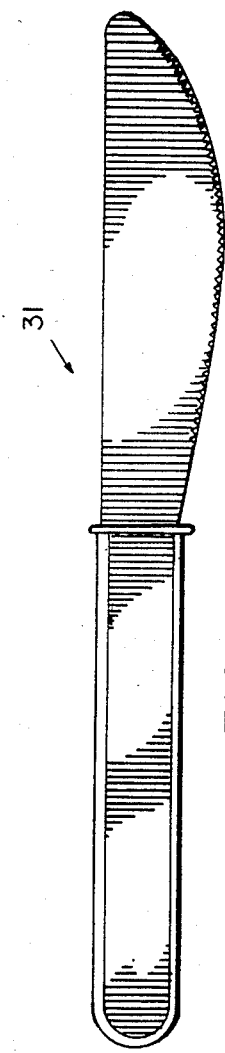
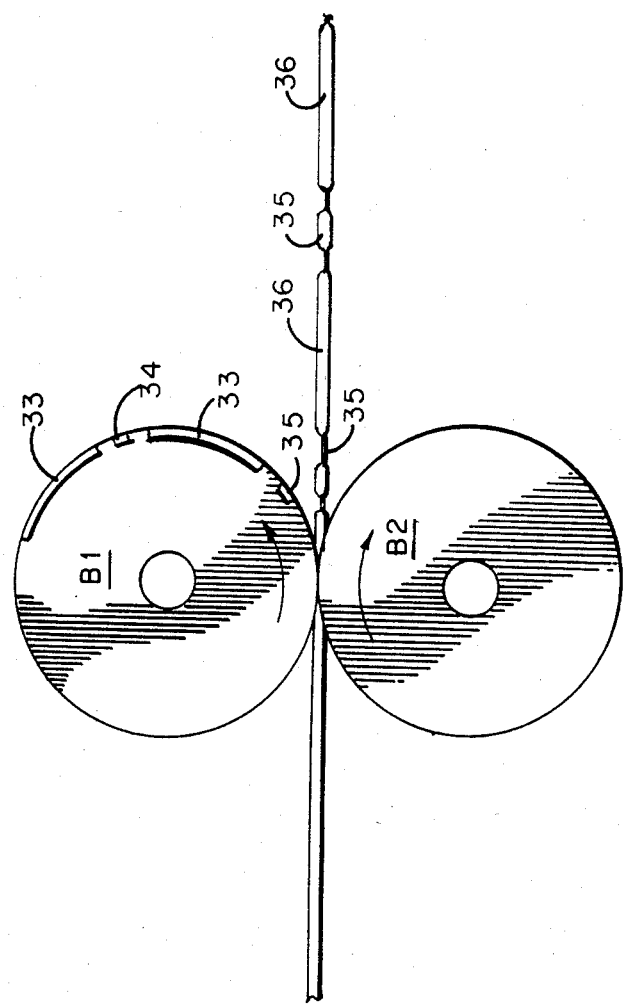

MAKING THERMOPLASTIC ITEMS

This application is a continuation-in-part of application Ser. No. 459,461, filed Jan. 20, 1983, now abandoned.

The present invention relates in general to making thermoplastic items and more particularly concerns novel apparatus and techniques for markedly increasing the rate at which thermoplastic items may be fabricated with apparatus that is relatively easy and inexpensive to fabricate and operate with relatively few personnel.

A typical prior art approach for manufacturing thermoplastic items involves injection molding. Hot plastic is injected into a mold, the mold is cooled to solidify the plastic, the mold sections separated to expose the molded thermoplastic items and the items removed from the mold. This approach involves considerable time and labor.

It is an important object of this invention to provide improved methods and means for producing thermoplastic items.

According to the invention extrude a film of thermoplastic material, establish the temperature of the extrudate at the low end of the extruding range, typically 250°-550° F., move the extrudate through opposed moving dies that travel with the film to mold an item in the extrudate, cool the molded item, and remove the molded item from the extrudate. Suitable apparatus may comprise opposed rollers with mating dies and means for applying a mold release substance to the dies on the rollers. There may be a sequence of opposed pairs of rollers for molding different portions of an item or for molding respective items.

More particularly, the present invention relates to methods and means for forming small plastic items and/or composite items containing thermoplastic polymer. The invention comprises in series an extruder, feed mechanisms to supply materials, means to cool the extruded thermoplastic polymer to a temperature near the second order transition temperature (glass transition point), means to allow the temperature of the cooled extrudate to substantially homogenize; that is to say, the temperature of the cooled extrudate at or near the glass transition point occurs throughout the extrudate, and then the extrudate thus homogeneously cooled is formed between a pair of rotating dies. There is means to further cool the items formed after they egress the die closure zone. The work put into the extrudate as it passes through the dies is generally sufficient to cause both a temperature rise in the extrudate and a preferential alignment of the polymer molecules parallel to the pass direction; that is, along the direction of movement of the extrudate between the dies. This latter effect is particularly advantageous when enhanced strength in longitudinal bending of the item produced; that is, such as a piece of plastic cutlery, is desirable.

Numerous other features, objects and advantages of the invention will become apparent from the following specification when read in connection with the accompanying drawing, in which FIG. 1 is a diagrammatic representation of a system according to the invention;

FIG. 3 is plan view of a plastic knife fabricable according to the invention;

FIG. 4 illustrates the mold for fabricating the knife of FIG. 3;

FIG. 5 is a diagrammatic representation of a system for continuously making knives according to the invention;

Figure 1:
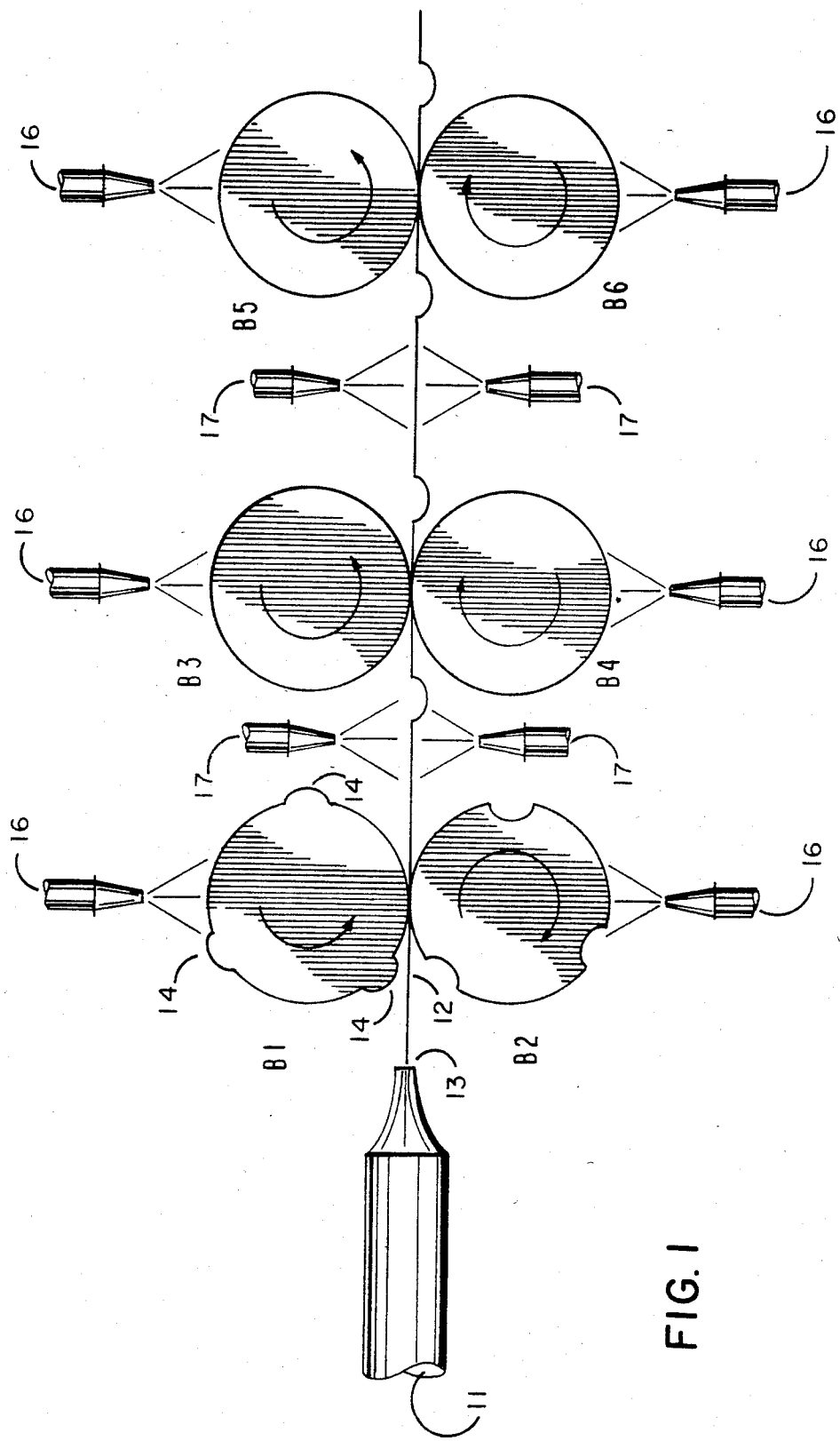

With reference now to the drawing, and more particularly FIG. 1 thereof, there is shown a pictorial representation of an exemplary embodiment of the invention. A continuous extruder 11 provides a stream of extrudate 12 at its outlet 13 that is drawn through rollers B1 and B2, B3 and B4, and B5 and B6. Each pair of rollers may include mating dies that mesh with the extrudate therebetween to form an item, such as male dies 14 on roller B1 and female dies 15 on roller B2 to mold four items on each revolution.

Mold release agents may be sprayed on the rolls, such as at 16, to facilitate releasing the molds from the extrudate.

The temperature of the extrudate may be altered by heating or cooling between roll pairs as indicated at 17 and 18. The extrudate that leaves rollers B5 and B6 thus comprises a sequence of molded thermoplastic items connected together which may be run through a cooling bath, if desired, and then separated manually or automatically to provide the finished items.

An important aspect of the invention is that the extrudate that is formed by the molds is maintained at the low end of the extruding range, typically between 250° and 550° F. It may be cooled further so that the material is workable but sufficiently stiff to retain the shape after working. It may be advantageous to control the temperature of the molds by suitable means known in the art so as to maintain the mold temperature between 150° and 250° F.

Figure 2:
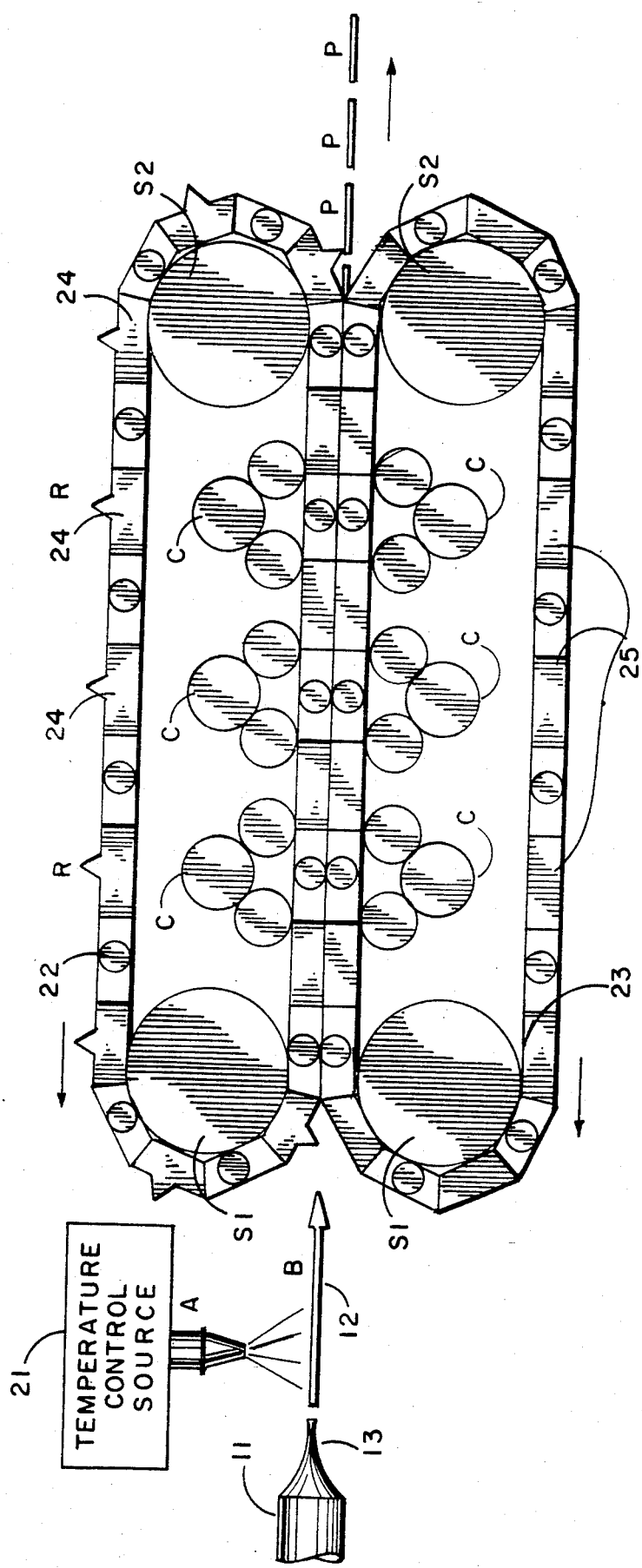
FIG. 2 is a diagrammatic representation of another system according to the invention with a pair of endless chains carrying opposed pairs of mating dies.

With reference to FIG. 2, there is shown another embodiment of the invention using a pair of endless chains riding on sprockets to carry opposed pairs of mating dies. Corresponding elements are identified by the same reference symbol throughout the drawing. A temperature control source 21 may spray the extrudate 12 after outlet 13 to establish the extrudate at a predetermined temperature as it enters between opposed endless chains 22 and 23 around a front pair of sprockets S1 and a rear pair of sprockets S2. The upper chain carries a sequence of male dies, such as 24 that each mate with a corresponding female die, such as 25, carried by lower chain 23. Registration pins, such as R on a male die 24 mate with corresponding openings (not visible in FIG. 2) in each female die 25 to maintain registration as the dies pass around sprockets S1. Compression rollers C urge the male dies 24 and female dies 25 together as they move between sprocket pairs S1 and S2. The molded parts P emerge as upper chain 22 and lower chain 23 move counterclockwise and clockwise, respectively, about a respective sprocket S2.

As a specific example consider the production of a plastic knife. Referring to FIG. 3, there is shown a plastic knife typically having a maximum width of ¾" and a maximum thickness of 0.1". A multiplicity of knives 31 may be made from a band of polystyrene, typically having an average molecular weight of 100,000, 0.1" thick by about ⅞" wide that is extruded at conventional temperatures, typically 450°-550° F., in extruder 11 (FIG. 1). This band 12 ejected at outlet 13 may be passed through a water bath (not shown in FIG. 1) maintained at 100° C., the boiling point of water, and maintained in the bath until its average temperature has fallen to typically 150° C. Any water clinging to the band from its previous passage through the water bath boils off during the subsequent temperature stabilization zone before being formed. The low heat transfer coefficient existing between the band 12 and the gas, which may be air, does not permit any appreciable further cooling of band 12. In fact the temperature of the surface of band 12 rises as heat is transferred from the hot interior to the cooler exterior. This stabilization zone allows the temperature of band 12 to substantially equilibrate at a temperature near the glass transition (of the order of 100° C.) temperature, but slightly higher of the order of 125° C.

Band 12 is then passed through the rolling dies to form the parts. Since the band thickness is greater than the average thickness of the part to be formed, extrudate piles up in front of the line of mold closure as it is extruded backwards against the flow of the band. This backwards extrusion causes the preferential alignment of the molecules in the pass direction. This backwards extrusion also may have the effect of preferentially removing the least viscous; that is, the hottest, material from the part being formed during passage through the nip of the rolls since this material is preferentially extruded out of the high pressure zone at the nip. Depending on the speed of operation, the temperature of the rolls, and the closing force on the rolls, the average temperature of the material may rise or fall during passage through the roll nip. Very high pressures, approaching the elastic limit of the mold material, ca 50–100,000 psi, can be exerted on the polymer band 12. This pressure impresses very fine detail upon the parts being formed. The mold is closely confined near the transverse edges of the part so that minimum "flash" will remain attached to the part. The mold is provided with reliefs outboard of these confining surfaces and reliefs between successive working cavities to dump any excess accumulation of material at the roll nip. The parts and dump zones may be connected by small stringers to facilitate subsequent handling of the product string. The molds may be equipped with suitable ejection devices to assure removal of the product from the cavities and dump zones. Excess material flowing into the relief zones may be removed by suitable means and recycled as scrap.

Referring to FIG. 4, there is shown a typical mold with relief zones 32, dump zones 33 and working cavity 34. Referring to FIG. 5, there is shown a diagrammatic representation of a portion of the system of FIG. 1 illustrating this example showing the location on upper roll B1 of working cavity 33, dump zone 34 and showing connecting strip 35 and part 36.

Figure 6:
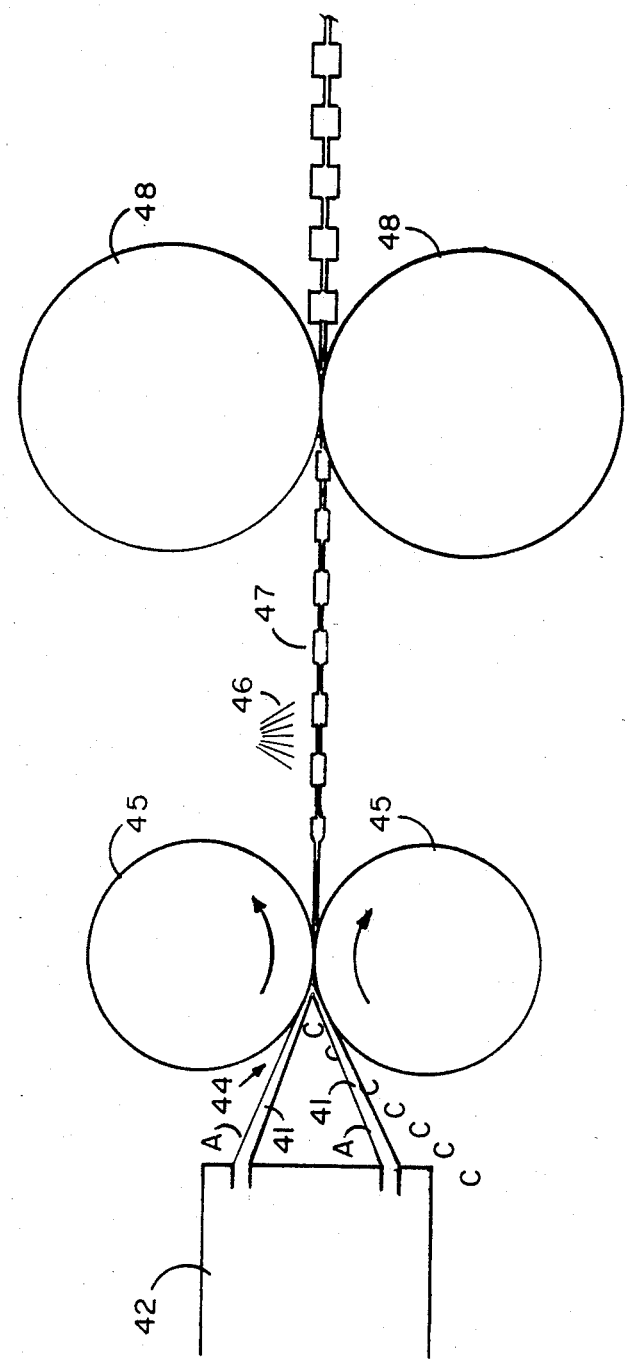
FIG. 6 is a diagrammatic representation of a system for making composite items.

Consider a second example for making composite items. Referring to FIG. 6, there is shown a diagrammatic representation of a system for making composite items. Bands of polymer 41 are extruded from extruder 42 providing the twin bands. Metal parts 43, such as electrical plugs or jacks, are preheated above the glass transition temperature and fed between these bands at 44. This ensemble then passes through roll set 45 where sealing of the two plastic bands occurs. The ensemble band is then cooled and then temperature stabilized as previously described in zones 46 and 47. When the band passes through forming rolls 48, the interior portion of the band, being the hottest and least viscous, is forced into any crevices in the metal part 43, thereby forming mechanical joints. It is thus possible to produce an attachment between the polymer and metal which is as strong as the polymer.

Figure 7:
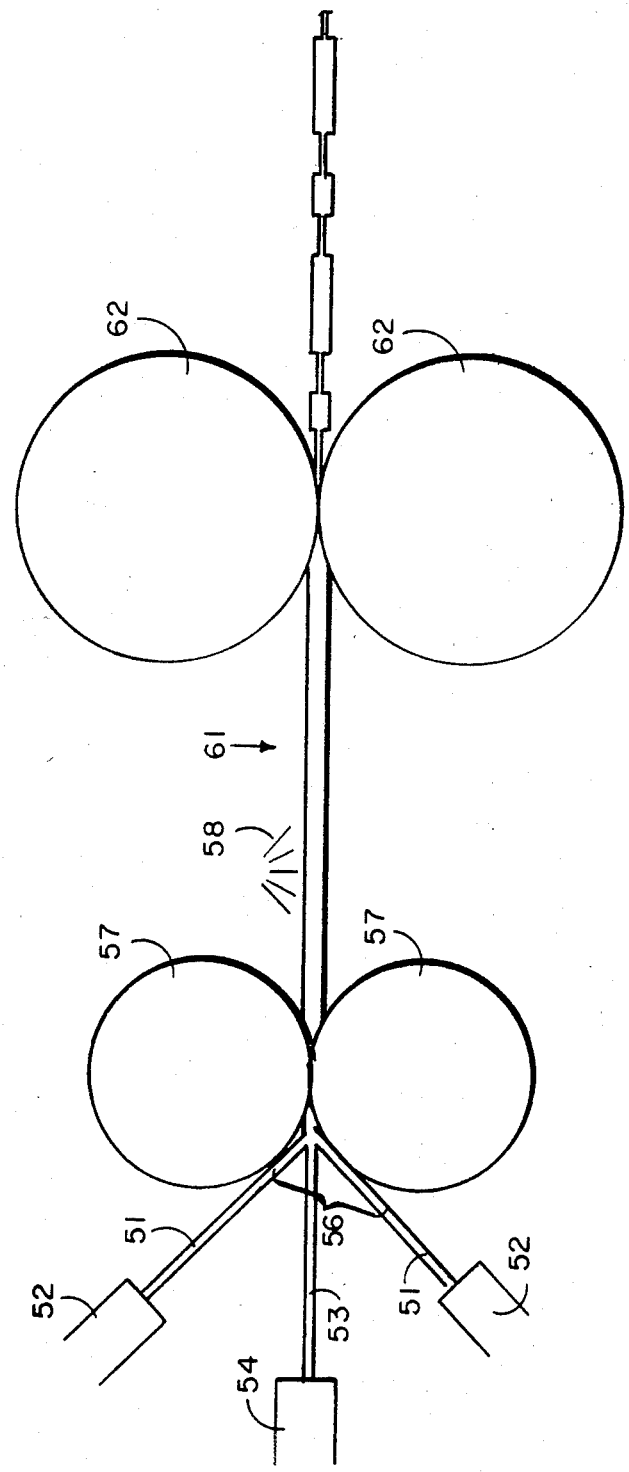
FIG. 7 is a diagrammatic representation of another example of using the invention for making composite items.

Referring to FIG. 7, there is shown a diagrammatic representation of another example of the invention for making composite items. Bands of polymer 51 are extruded from extruders 52. A third band of polymer 53 heavily laden with filler, such as clay, is introduced from extruder 54 between the outer bands 51 in zone 56, and a preliminary consolidation of this ensemble occurs at rolls 57. The material is then cooled in zone 58, and heat stabilized in zone 61 before formation of the final parts as the band passes through rolls 62.

Contact between the filled polymer 53, which will usually be too abrasive to force through any small passages for economically reasonable times before the passages wear too much, and any metal surfaces other than the initial extruder 54 can be substantially eliminated. The cooling and heat stabilization zones may also be adjusted to have the filled material portion of the composite band be at a substantially higher temperature, thereby lowering its viscosity, than the lower portions of the composite band so as to facilitate the forming operation. Properties which may be esthetically pleasing, such as weight or interior pigmentation, may be imparted to plastic cutlery by such a technique. This technique may also be used to reduce cost of the finished item when the interleaved material has a lower price than polymer 51 while still yielding a finished item with a polymer 51 exterior.

The invention has a number of advantages. Mold costs are relatively low, production is very high and labor costs relatively low. The principles of the invention may also be embodied in the form of mold pairs carried by caterpillar treads, for example. The invention may also be used to insert cold plastic elements into the extrudate by using an inserter instead of or in addition to the molds.

An example of thermoplastic material suitable for use according to the invention is acrylonitrilebutadiene-styrene co-polymer, polyvinyl chloride, polycarbonate and polyethylene.

There has been described novel techniques and apparatus for rapidly and continuously forming thermoplastic items at relatvely low cost and with relatively little labor. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A method of continuously making thermoplastic polymer items which method includes the steps of,
   expelling from an extruder outlet an extrudate band of thermoplastic polymer at a temperature at the low end of the extruding range substantially between 350° and 550° F.,
   cooling said extrudate band into the 200° F. range just above the glass transition temperature of said polymer as it moves away from said extruder outlet through a liquid bath, continuing to move the cooled band away from said extruder outlet and said liquid bath through a gas region to allow the temperature of said cooled band to homogenize, directing the band with homogenized temperature along a predetermined path further from said extruder outlet between meshing dies moving with said band while forming a predetermined shape therein, separating the meshing dies while they move with said band to leave the impression of an item therein, and further cooling said band to harden the shape of the item formed therein.

2. A method in accordance with claim 1 and further including the step of removing the hardened item from said band.

3. A method in accordance with claim 1 and further including the step of applying a mold release agent to said dies.

4. Apparatus for making thermoplastic items comprising, extruder means having an outlet for providing therefrom a thermoplastic polymer band at a temperature at the low end of the extruding range substantially between 350° and 550° F., liquid cooling means for cooling said band into the 200° F. range just above the glass transition temperature of said polymer as it moves away from said extruder to provide said band cooled, means for moving the cooled band further away from said extruder outlet through a gas region to allow the temperature of said cooled band to homogenize, meshing die means for forming a predetermined shape in the homogenized band, means for directing said homogenized band along a predetermined path between said meshing dies, means for moving said meshing dies with said homogenized band to form said predetermined shape therein, means for separating said meshing die means while they move with said homogenized band to leave the impression of an item therein, and further cooling means for further cooling said homogenized band carrying the impression of an item therein to harden the shape of said item formed therein.

5. Apparatus in accordance with claim 4 and further comprising means for supporting said dies comprising at least one pair of opposed rollers.

6. Apparatus in accordance with claim 4 and further comprising, means for applying a mold release agent to said dies when located away from said extrudate.

7. A method in accordance with claim 2 and further including the step of applying a mold release agent to said dies.

8. Apparatus in accordance with claim 5 and further comprising, means for applying a mold release agent to said dies when located away from said extrudate.

9. A method in accordance with claim 1 and further including the steps of, expelling from a second extruder outlet a second extrudate band of thermoplastic polymer at a temperature at the low end of the extruding range substantially between 350° and 550° F., cooling said second extrudate band into the 200° F. range just above the glass transition temperature of said polymer as it moves away from said second extruder outlet through a liquid bath, continuing to move the cooled second band away from said second extruder outlet and said liquid bath through a gas region to allow the temperature of said second cooled band to homogenize, directing said second band with homogenized temperature toward said predetermined path to define a region between said first and second bands just before said meshing dies, inserting elements between said first-mentioned and said second bands in said region, directing said second band with homogenized temperature along said predetermined path further from said extruder outlet between said meshing dies moving with said first-mentioned and said second bands and said elements therebetween while forming a predetermined shape therein, separating the meshing dies while they move with said bands to leave the impression of an item therein which item therein includes a said element, and further cooling said second band to harden the shape of the item formed in said first-mentioned and said second band with said elements therebetween.

10. A method in accordance with claim 9 wherein the step of introducing said elements in said region includes the steps of, expelling from a third extruder outlet a third band of polymer heavily laden with filler which third band comprises said elements.

* * * * *